US012354789B1

(12) United States Patent
Miesner

(10) Patent No.: US 12,354,789 B1
(45) Date of Patent: Jul. 8, 2025

(54) METHODS FOR MANUFACTURING SADDLE COILS

(71) Applicant: The United States of America, as represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 513 days.

(21) Appl. No.: 17/680,381

(22) Filed: Feb. 25, 2022

(51) Int. Cl.
*H01F 7/06* (2006.01)
*H01F 41/074* (2016.01)
*H01F 41/071* (2016.01)

(52) U.S. Cl.
CPC .... *H01F 41/074* (2016.01); *H01F 2041/0711* (2016.01)

(58) Field of Classification Search
CPC ....................... H01F 41/074; H01F 2041/0711
See application file for complete search history.

(56) References Cited

U.S. PATENT DOCUMENTS 4,763,848 A 8/1988 Bernhard
5,446,432 A 8/1995 Ikeuchi
7,741,944 B2 6/2010 Leghissa et al.
7,798,441 B2 9/2010 Stelzer et al.
8,058,764 B2 * 11/2011 Wiezoreck ............. H02K 55/04 29/605
8,245,580 B2 * 8/2012 Rogers .................. H01F 41/071 73/861.11
8,510,932 B2 8/2013 Meinke
8,674,692 B2 3/2014 Camp
8,886,266 B2 11/2014 Shinzato et al.
9,817,090 B2 11/2017 Sambandamurthy et al.
9,831,021 B2 * 11/2017 Meinke ................... H01F 41/04
10,002,696 B2 6/2018 Stelzer et al.
10,453,597 B2 10/2019 Meinke et al.
2009/0051241 A1 2/2009 Wiezoreck
2012/0081122 A1 4/2012 Frey
2019/0280543 A1 9/2019 Tamura et al.

OTHER PUBLICATIONS

Koyanagi et al., "Development of Saddle-Shaped Coils for Accelerator Magnets Wound With YBCO-Coated Conductors," IEEE Transactions on Applied Superconductvity, vol. 25, No. 3, Jun. 2015, publication date Dec. 25, 2014, current version date Feb. 5, 2015.

* cited by examiner

*Primary Examiner* — Paul D Kim
(74) *Attorney, Agent, or Firm* — Dawn C. Russell; Howard Kaiser; Jesus J. Hernandez

(57) ABSTRACT

The invention relates to saddle coil winding apparatus, methods of manufacturing saddle coils, and saddle coils produced using the winding apparatus and/or manufacturing methods. The saddle coil winding apparatus and methods of manufacturing beneficially reduce or eliminate the stretching of electrical wires, and do not cause the electrical wires to slide past each other. The saddle coils produced using the winding apparatus and/or manufacturing methods may have electrical leads provided on the outside of the coil.

13 Claims, 9 Drawing Sheets

METHODS FOR MANUFACTURING SADDLE COILS

STATEMENT OF GOVERNMENT INTEREST

The invention described herein may be manufactured and used by or for the Government of the United States of America for governmental purposes without payment of any royalties thereon or therefore.

FIELD OF THE INVENTION

The invention relates to saddle coil winding apparatus, methods of manufacturing saddle coils, and saddle coils produced using the winding apparatus and/or manufacturing methods. The saddle coil winding apparatus and methods of manufacturing beneficially reduce or eliminate the stretching of electrical wires, and do not cause the electrical wires to slide past each other. Saddle coils produced using the winding apparatus and/or manufacturing methods may have electrical leads provided on the outside of the coil.

BACKGROUND OF THE INVENTION

Methods of manufacturing saddle coils typically involve winding a flat coil and then bending it into a saddle shape. These methods require that the starting lead of the coil pass over the coil windings to the outside of the coil for electrical connection. Such methods may attempt to reduce stretching of the wire during the bending process by winding the flat coil against an inclined wire form so that the top layers are longer than the bottom layers.

However, these methods and wire forms still force the wires to slide laterally relative to each other during bending from the flat coil configuration to the saddle shape, which can result in wire deformation and insulation damage. Rectangular wires are particularly subject to deformation during this bending step due to wire corners interfering with each other, which prevents the required lateral motion.

Accordingly, there is a need in the art for apparatus and methods to manufacture a saddle coil in which electrical leads are located on the outside of the coil. There is also a need for apparatus and methods to manufacture saddle coils in which wires do not cross over the windings, and wires are not stretched or forced to slide past each other.

SUMMARY OF THE INVENTION

The invention described herein, including the various aspects and/or embodiments thereof, meets the unmet needs of the art, as well as others, by providing saddle coil winding apparatus, methods of manufacturing saddle coils, and saddle coils produced using the winding apparatus and/or manufacturing methods. The saddle coil winding apparatus and methods of manufacturing beneficially reduce or eliminate the stretching of electrical wires, and do not cause the electrical wires to slide past each other. The invention beneficially allows the use of large rectangular wire, imposes no wire stretch, and results in start and end leads that are provided on the outside of the coil.

In a first aspect of the invention, an apparatus for winding a saddle coil is provided, which includes a flexible coil bending plate, two coil form side plates, two coil end support plates, a rigid top plate, two end plates and, a coil bending form, wherein the coil form side plates, coil end support plates, rigid top plate, and end plates are removably attached to the flexible coil bending plate, and wherein the saddle coil winding device produces a saddle coil using electrical wire, where electrical leads are provided on the outside of the coil.

Another aspect of the invention provides a saddle coil winding method, including the steps of attaching coil form side plates and coil end support plates to a flexible coil bending plate; releasably attaching a rigid top plate to the coil end support plates on the flexible coil bending plate, forming a winding space to constrain an electrical wire; winding the electrical wire around the coil form side plates and coil end support plates between the flexible coil bending plate and the rigid top plate, forming a single coil layer having a desired number of turns; removing the rigid top plate and coil form side plates; bending the flexible bending plate with attached coil end support plates into conformance with a coil bending form, thereby bending the single coil layer into a saddle coil layer; applying a coating to the saddle coil layer; and removing the coil end support plates and freeing the saddle coil layer from the flexible coil bending plate.

According to a further aspect of the invention, the saddle coil winding method further includes the steps of stacking multiple saddle coil layers, where each subsequent saddle coil layer has a bend radius that is increased from that of the previous saddle coil layer by the thickness of the electrical wire used to form the saddle coil layers, and where the winding direction of each subsequent saddle coil layer is reversed from the winding direction of the previous saddle coil layer; and connecting the inner and outer leads of the saddle coil layers such that the layers are in series with current flowing in the same direction in each layer, thereby forming a multilayered saddle coil.

Other features and advantages of the present invention will become apparent to those skilled in the art upon examination of the following or upon learning by practice of the invention.

BRIEF DESCRIPTION OF THE DRAWINGS

FIG. 3A shows a saddle coil and an equivalent flat coil wound according to the length-preserving geometric transformation.

FIG. 3B is the top view of a saddle coil having an equivalent flat coil wound according to the length-preserving geometric transformation superimposed over it. FIG. 3C is the side view of a saddle coil and equivalent flat coil wound according to the length-preserving geometric transformation.

DETAILED DESCRIPTION OF THE INVENTION

Figure 1:
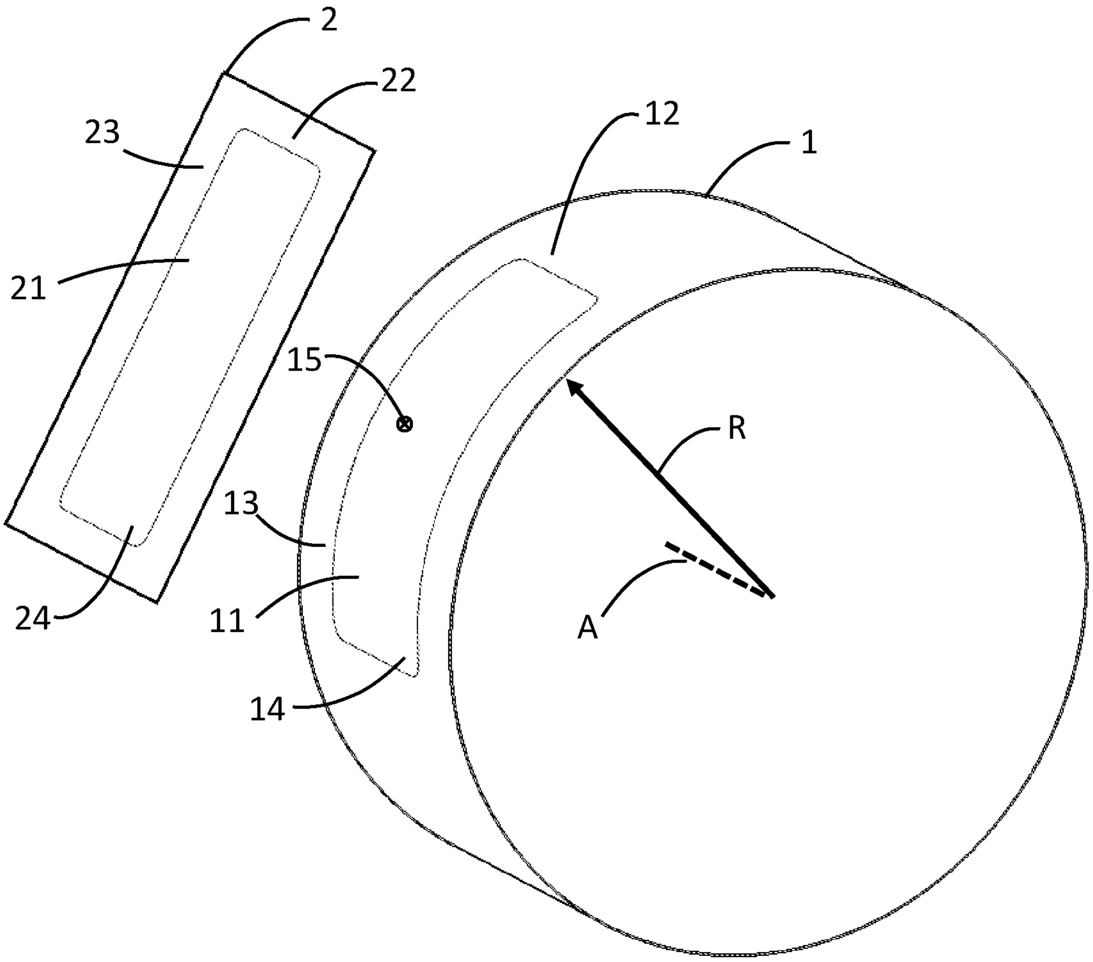
FIG. 1 shows a cylinder with a saddle shaped curve and the projection of the curve normal to a planar surface.

The invention provides saddle coil winding apparatus, methods of manufacturing saddle coils, and saddle coils produced using the winding apparatus and/or manufacturing methods. The saddle coil winding apparatus and methods of manufacturing beneficially reduce or eliminate the stretching of electrical wires, and do not cause the electrical wires to stretch or slide past each other. The saddle coils produced using the apparatus and methods of the invention include saddle coils having one or both electrical leads on the outermost surface of the coil.

The saddle coil winding apparatus of the invention beneficially permits saddle coils to be made that avoid the need to cross over the windings. A length-preserving geometric transformation is used, in which the two coil sides that follow the curvature of the cylinder are transformed into flat arcs with the same radius as the cylinder. This allows a flat coil to be wound that has the same wire length as the desired saddle coil. Bending the flat coil into the saddle shape involves only wire bending, which may be accomplished while the flat coil is on the saddle coil manufacturing apparatus, or after the flat coil is removed from the saddle coil manufacturing apparatus. By using the apparatus of the invention, there is no lateral relative motion of the wires relative to adjacent wires. There is also no length change that would cause the wire to stretch as a result of bending.

A saddle coil has a shape that follows a portion of a cylinder, in which at least two opposing sides have a radius of curvature that conforms to a portion of the circumference of a cylinder having a radius R. In some aspects of the invention, the portion of the circumference of the cylinder that is encompassed by the curved sides of the saddle coil is preferably about one half or less.

The geometric transformation used in the methods of the invention results in a flat coil having two opposed, curved sides, where the curved sides have a radius of curvature R. The flat coil has the same wire length in each turn as the corresponding desired saddle coil. The two sides that follow the curvature of a cylinder are transformed into flat arcs having the same radius R as the theoretical cylinder on which they are modeled. Bending such a flat coil into a saddle shape involves only wire bending, without any lateral relative motion of wires with respect to adjacent wires, or any length change that would require the wire to stretch.

Multiple single-layer saddle coils produced in accordance with the invention may be assembled to produce a multilayer saddle coil of any desired thickness. In this aspect of the invention, the bend radius R of the first saddle coil layer is that of the desired multilayer saddle coil inner radius. The bend radius of each subsequent saddle coil is increased from that of the previous layer by the thickness of the wire t. The second saddle coil layer has a bend radius that is equal to $R+t$, the third saddle coil layer has a bend radius that is equal to $R+[2\times t]$, and so on, such that the final outer radius of a multilayer saddle coil is $R+[(n-1)\times(t)]$, where n is the number of coil layers. This permits multilayer saddle coils to be formed such that no additional deformation of the saddle coils is required during the process of assembling the multiple saddle coil layers.

When used to produce a multilayer saddle coil, the winding direction of the individual single-layer saddle coils preferably alternates between clockwise and counter-clockwise. The wire ends of adjacent saddle coil layers are bonded together to place all of the coil layers in series. Preferably, the first and last saddle coil layers both have an accessible wire end on the outer perimeter of the coil for electrical connection.

These and other aspects of the invention will be described with respect to the Figures.

FIG. 1 shows a cylinder 1 with a circumference defined by a radius R, and a length defined by an axis A. A saddle-shaped curve 11 is shown on the surface of cylinder 1. Saddle shaped curve 11 includes two opposed sides 12 that are parallel to the cylinder axis A, two opposed sides 13 that follow the curvature of the cylinder, and four transition corners 14, which join the four sides. FIG. 1 also shows a planar surface 2 that is tangent to cylinder 1 at the centroid 15 of saddle shaped curve 11. Shape 21 is the projection of saddle shaped curve 11 normal to planar surface 2. Sides 22 are the projection of sides 12, and have the same length as sides 12. Sides 23 are the projection of sides 13, and are shorter than sides 13 because they do not account for their curvature. Four transition corners 24 join the four sides of the projected shape. The total length of the perimeter of projected shape 21 is less than the perimeter of saddle-shaped curve 11, and therefore the overall length is not preserved by the normal projection.

Figure 2:
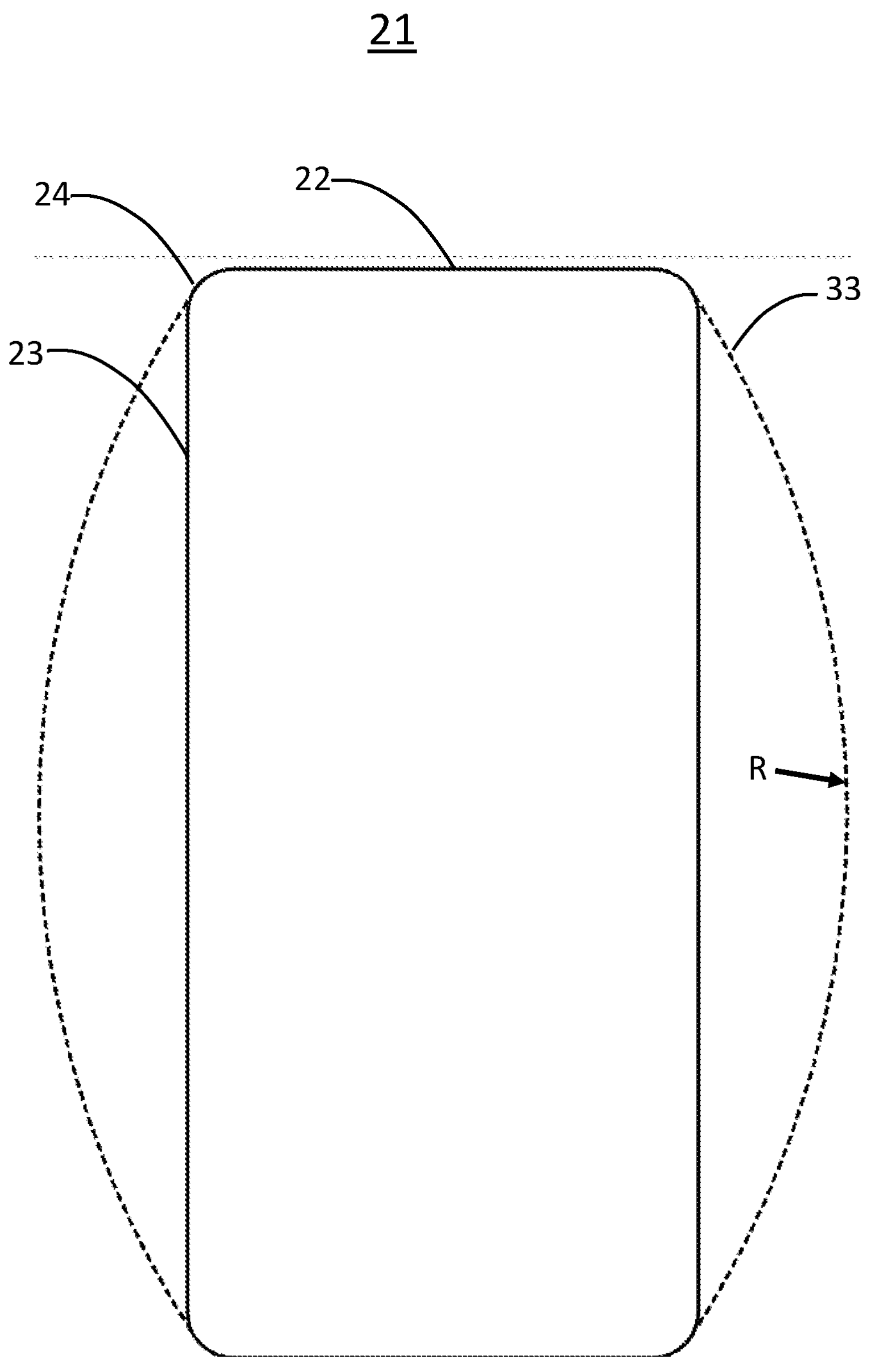
FIG. 2 shows a planar surface with a normal projection and with a length-preserving geometric transformation from a cylindrical system to a planar system.

FIG. 2 shows normally projected curve 21 with sides 22, 23, and transition corners 24. Also shown as dotted lines are arc segments 33 which have a radius of curvature R, and which are tangent to transition corners 24. Replacing sides 23 with arc segments 33 results in a length preserving geometric transformation of a saddle shaped curve.

Figure 3A:
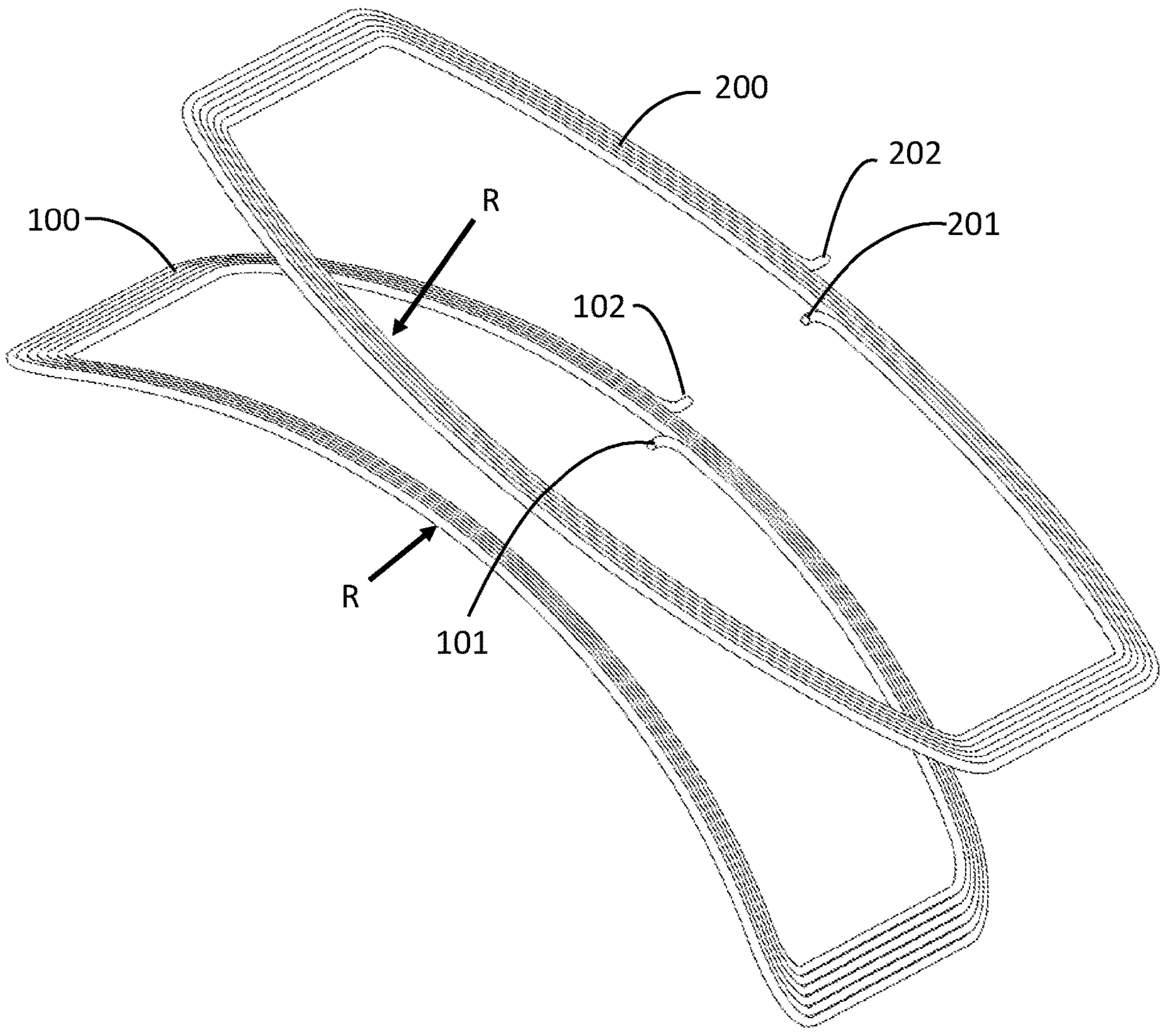
FIG. 3A-3C depict a saddle coil and an equivalent flat coil.
Figure 3B:
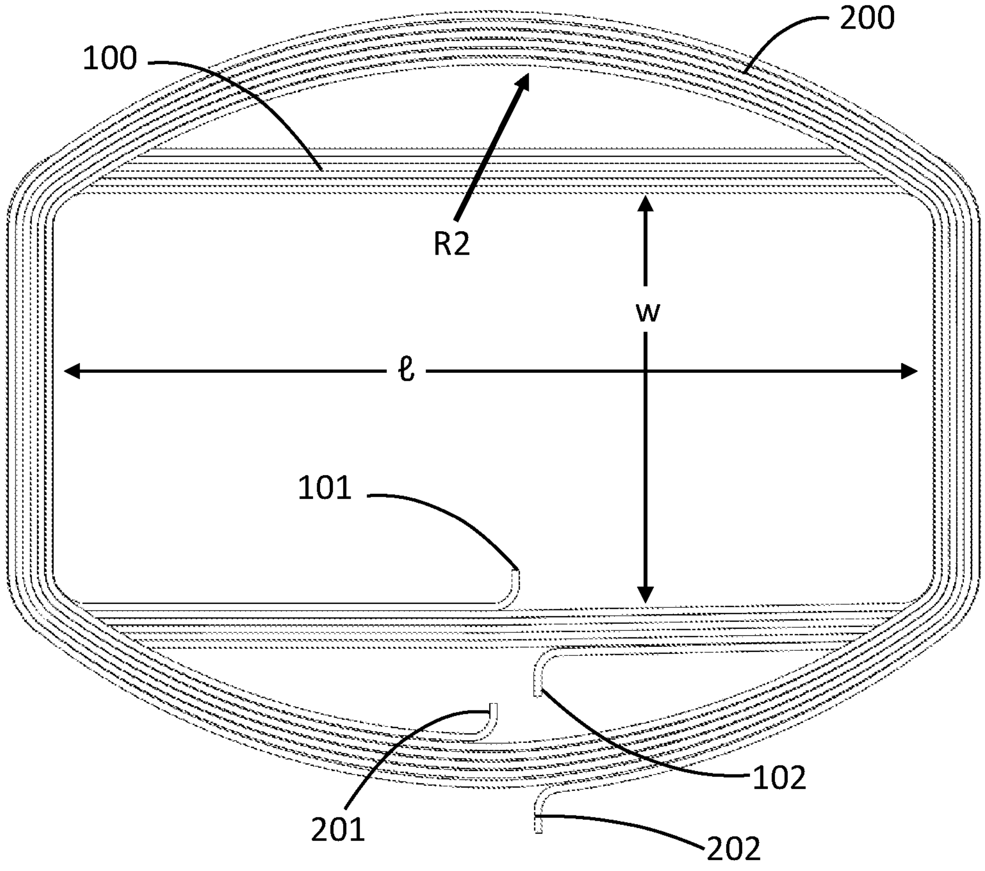
Figure 3C:
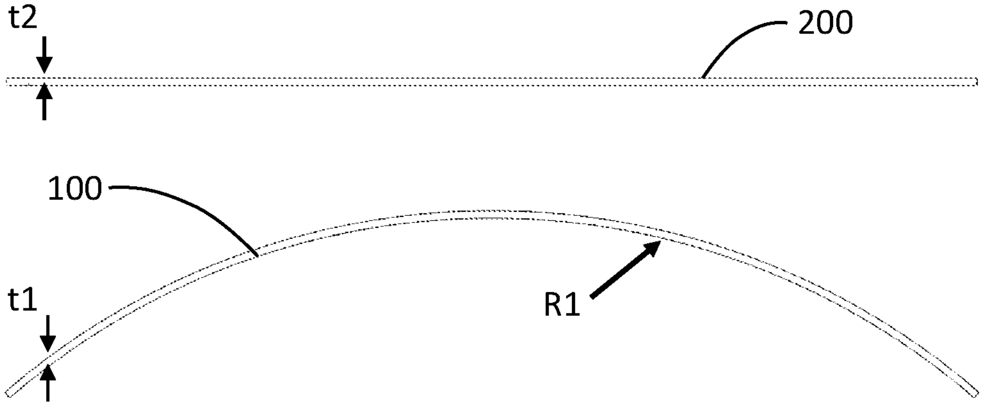

FIGS. 3A-3C are different views of a single layer saddle coil 100 and an equivalent single layer flat coil 200 having arc segments that are wound according to the length-preserving geometric transformation.

FIG. 3A is a perspective view that shows the saddle coil 100 relative to flat coil 200. The radius of curvature R1 of the curved sides of saddle coil 100 is the same as the radius of curvature R2 of the arc segment of flat coil 200. Single layer saddle coil 100 has starting wire lead 101 and ending wire lead 102, while equivalent single layer flat coil 200 has starting wire lead 201 and ending wire lead 202. The starting and ending wire leads are located on inner and outer perimeters of the coils, respectively.

FIG. 3B shows flat coil 200 superimposed over saddle coil 100. The saddle coil has an inner radius of curvature R1 (not shown), an inner width between the electrical wires w, and an inner planar projected length l. The single layer flat coil 200 has the same inner width between the electrical wires w and inner planar projected length l as the single layer saddle coil 100. The single layer saddle coil follows the cylinder radius R1, while equivalent single layer flat coil 200 has planar arcs with radius R2, where R1 and R2 are equal. The same length of wire is used in making both coils, and flat coil 200 may be bent into the shape of saddle coil 100 with only wire bending and without any lateral relative motion of wires or any length change which would require wire stretch. Single layer saddle coil 100 has starting wire lead 101 and ending wire lead 102 while equivalent single layer flat coil 200 has starting wire lead 201 and ending wire lead 202.

FIG. 3C is a side view of single layer flat coil 200 and single layer saddle coil 100. The flat coil is wound with a wire of thickness t2, and the saddle coil is wound with a wire of thickness t1. Preferably, the saddle coil 100 and flat coil 200 are formed using the same wire, and t1 and t2 are equal.

FIG. 4 through FIG. 8 depict manufacturing apparatus and processes for manufacturing a saddle coil according to the current invention. The saddle coil has a desired inner radius R1, desired inner width between the electrical wires of w1, and desired inner planar projected length of l1. The coil wire may be round or rectangular or consist of multiple strands such that each wound layer is of thickness t1.

Figure 4:
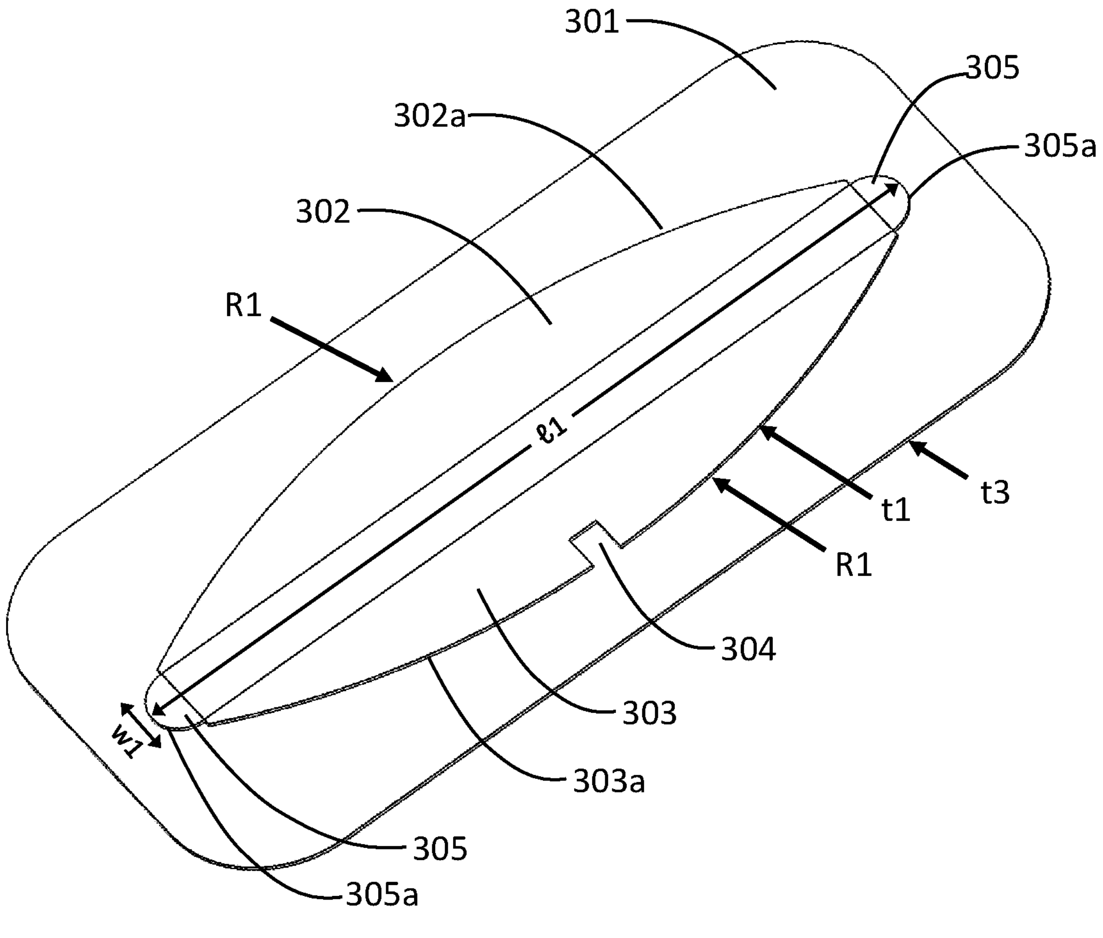
FIG. 4 shows the coil form and flexible bending plate of the device for manufacturing a saddle coil according to the invention.

FIG. 4 shows a saddle coil winding apparatus that may be used to manufacture a flat coil, and then bend the flat coil into the desired saddle coil shape. The apparatus includes a flexible plate 301 of thickness t3, Attached to flexible plate 301 are coil form sides 302 and 303 and coil end supports 305, which are the thickness t1 of a wound layer. Coil form side 302 has an outer edge 302*a* with radius equal to the desired inner radius of the finished saddle coil R1 and coil form side 303 has an outer edge 303*a*, also with radius R1. One of the coil form sides may have a cutout such as 304 for the starting wire lead. Coil end supports 305 have a width equal to the desired saddle coil inner width between the electrical wires w1 and have a total separation distance equal to the desired saddle coil inner planar projected length l1. Coil end supports 305 have an edge 305*a* which is tangent to the coil forms outer edges 302*a* and 303*a*. Coil end supports 305 may become a permanent part of the saddle coil, while coil form sides 302 and 303 will be removed.

Figure 5:
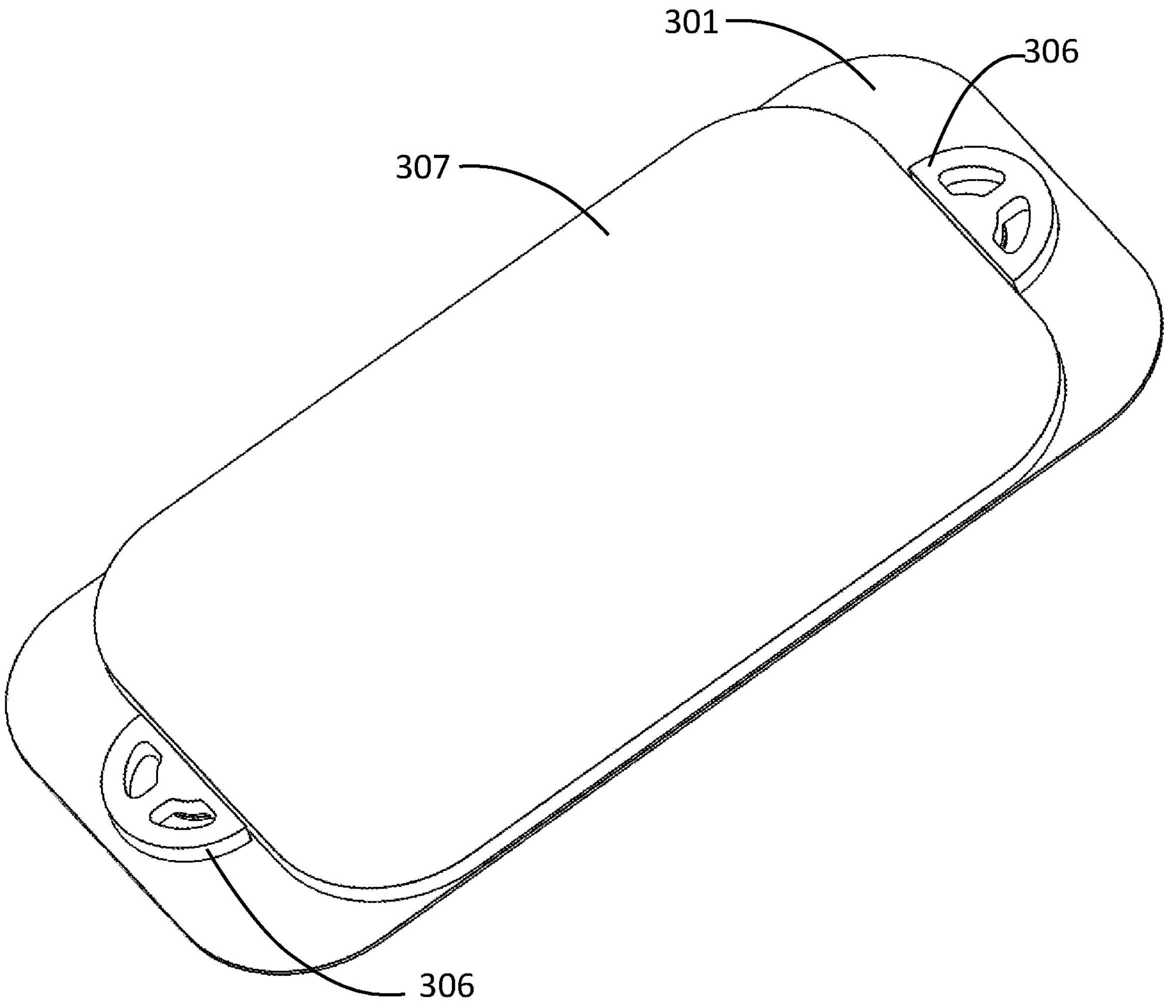
FIG. 5 shows the flexible bending plate, end support plates, and rigid top plate of the device for manufacturing a saddle coil according to the invention.
Figure 6:
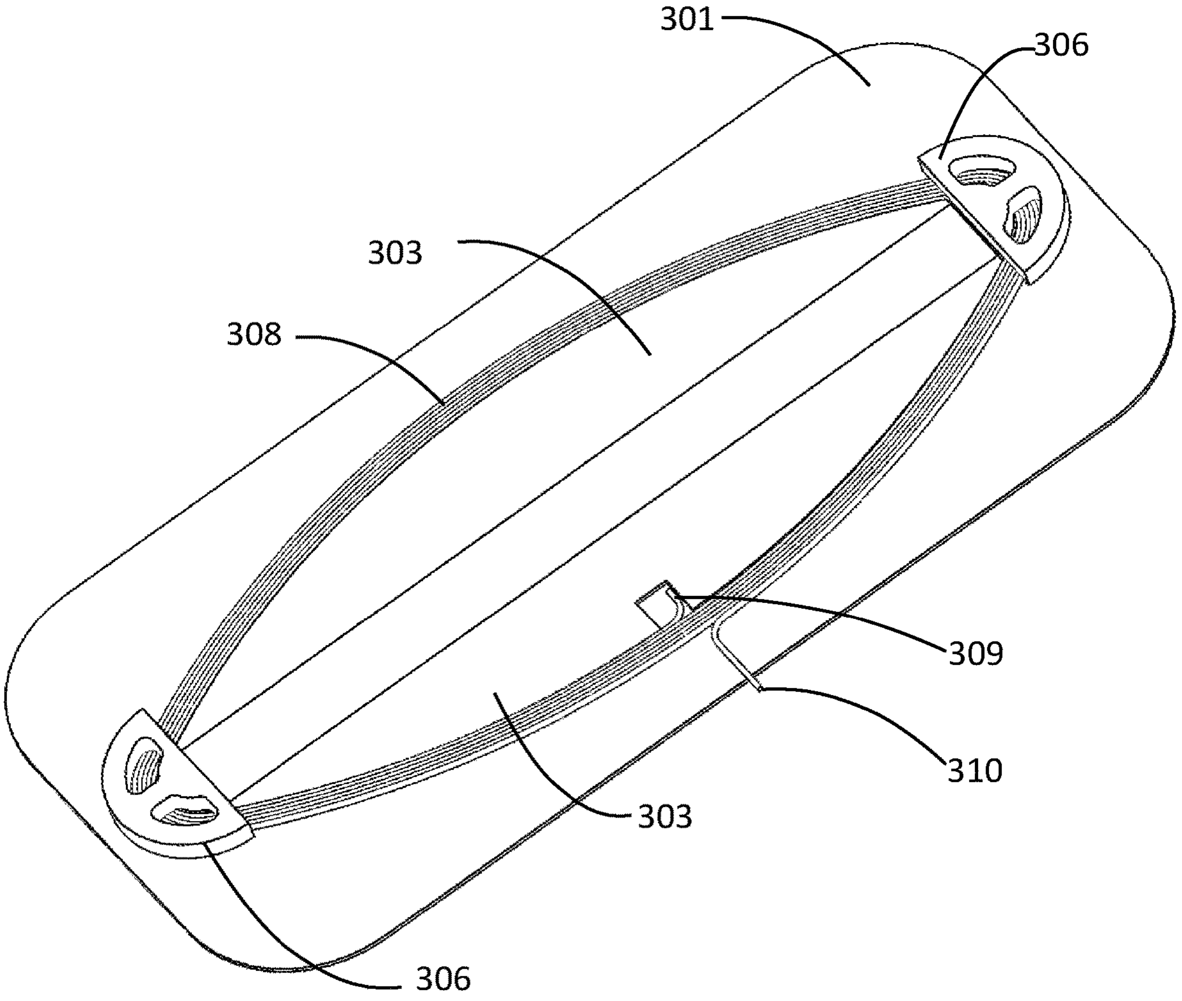
FIG. 6 shows a single layer flat coil wound according to the length-preserving geometric transformation with the coil form, flexible plate, and end plates of the device for manufacturing a saddle coil according to the invention.

FIG. 5 shows the arrangement during the coil winding process. Rigid top plate 307 and end plates 306 are attached to flexible plate 301 to provide support and to constrain the wire. Wire is wound against the coil form components in the space between the flexible plate 301 and the rigid top plate 307 and end plates 306 to form a single coil layer 308 with the desired number of turns. FIG. 6 shows an example coil layer 308 with the rigid top plate 307 removed. The coil starting lead 309 on the inside of the coil and ending lead 310 on the outside of the coil can be seen. The coil is held in position by end plates 306 and coil end supports 305.

Figure 7:
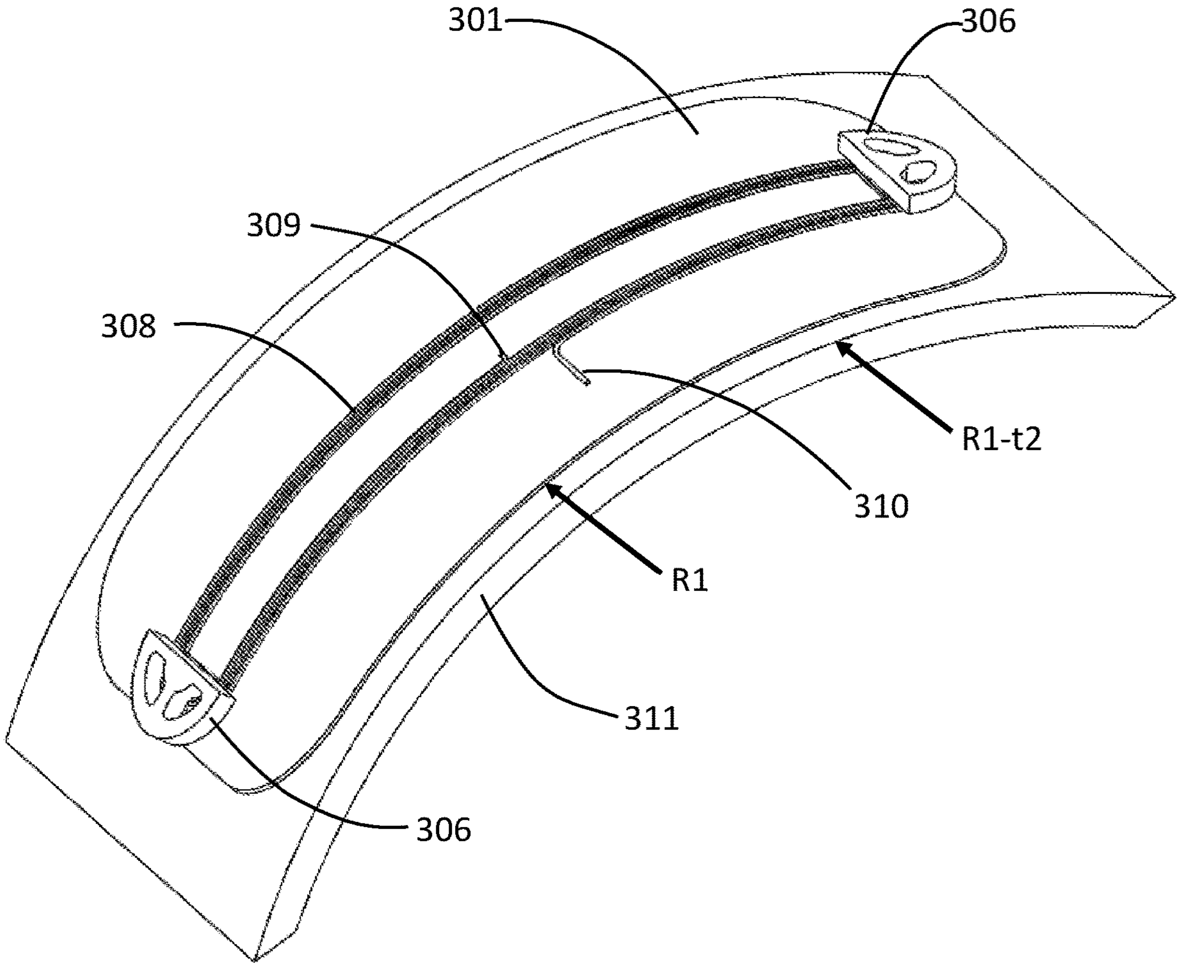
FIG. 7 shows a single layer saddle coil with the flexible plate and end plates on a bending form of the device for manufacturing a saddle coil according to the invention.

FIG. 7 shows the arrangement during the coil bending process. The coil form sides 302 and 303 are removed and then flexible plate 301 is bent into conformance with bending form 311. Bending form 311 is a partial cylinder with radius equal to R1-*t*2. Therefore, when flexible plate 301 is bent into conformance, the coil layer 308 is also bent into the desired saddle shape with radius R1. This bending does not require any lateral relative motion of wires or any wire stretch because each turn of the coil layer 308 has the same length as the desired saddle coil. Epoxy or other coatings are then applied to protect coil layer 308 and to hold its shape. When the epoxy is cured, the end plates 306 and coil layer 308 are removed.

Figure 8:
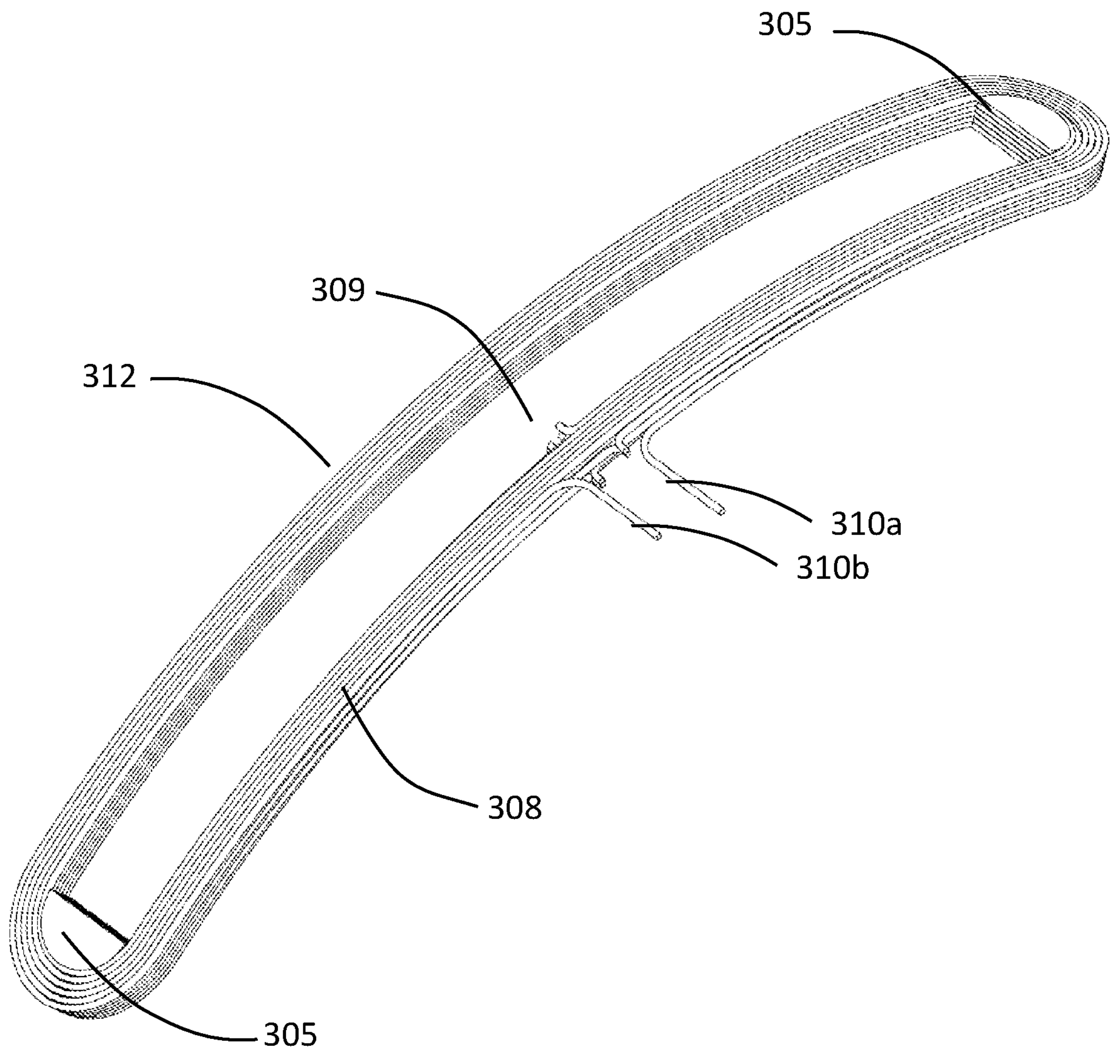
FIG. 8 shows an example of a six-layer saddle coil manufactured in accordance with the apparatus and methods of the invention.

The desired number of coil layers 308 are stacked to form a complete saddle coil 312 as shown in FIG. 8. The bend radius of the first layer is that of the desired multilayer saddle coil inner radius R1. The bend radius of each subsequent layer is increased from that of the previous layer by the thickness of the wire t1 so that no additional deformation is required during the stacking process. The winding direction is alternated for coil layer such that if one coil is wound clockwise then the coils above it and below it are wound counterclockwise. The starting lead 309 of each coil layer is connected with one adjacent coil such that the first layer is connected to the second layer, the third layer is connected to four layer, etc. The ending lead 310 of each coil layer is connected with one adjacent coil such that the second layer is connected to the third layer, the fourth layer is connected to the fifth layer, etc. The ending lead 310 of first and last coil layer are not connected and serve as the wiring leads for the multilayer saddle coil 312. This wiring arrangement places the coil layers in series with current flowing in the same direction in each layer.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed is:

1. A saddle coil winding method, comprising:

attaching coil form side plates and coil end support plates to a flexible coil bending plate;

releasably attaching a rigid top plate to the coil end support plates on the flexible coil bending plate, forming a winding space to constrain an electrical wire;

winding the electrical wire around the coil form side plates and coil end support plates between the flexible coil bending plate and the rigid top plate, forming a single coil layer having a desired number of turns;

removing the rigid top plate and coil form side plates;

bending the flexible bending plate with attached coil end support plates into conformance with a coil bending form, thereby bending the single coil layer into a saddle coil layer; and removing the coil end support plates and freeing the saddle coil layer from the flexible coil bending plate.

2. The saddle coil winding method of claim 1, wherein the coil form side plates and coil end support plates have approximately the same thickness as the electrical wire.

3. The saddle coil winding method of claim 1, wherein the coil form side plates have an outer edge with radius equal to a desired inner radius of the saddle coil layer.

4. The saddle coil winding method of claim 1, wherein the coil end support plates have a width equal to a desired inner width of the saddle coil layer.

5. The saddle coil winding method of claim 1, wherein the coil end support plates have a total separation distance equal to a desired inner planar projected length of the saddle coil layer.

6. The saddle coil winding method of claim 1, wherein the coil form side plates have outer edges, and wherein the coil end support plates have an edge that is tangent to the outer edges of the coil form side plates.

7. The saddle coil winding method of claim 1, wherein the coil form side plates include a cutout for receiving a starting lead of the electrical wire.

8. The saddle coil winding method of claim 1, wherein the coil bending form is a partial cylinder with a radius equal to a desired radius of the saddle coil layer minus a thickness of the flexible coil bending plate.

9. The saddle coil winding method of claim 1, wherein the electrical wire is not stretched during winding.

10. The saddle coil winding method of claim 1, wherein the electrical wire does not cross over itself during winding.

11. The saddle coil winding method of claim 1, wherein the saddle coil layer has electrical leads on an outside of the saddle coil layer.

12. The saddle coil winding method of claim 1, further comprising:

stacking multiple saddle coil layers, wherein each subsequent saddle coil layer has a bend radius that is increased from that of a previous saddle coil layer by a thickness of the electrical wire used to form the saddle coil layers that are stacked, and wherein a winding direction of each subsequent saddle coil layer is reversed from the winding direction of the previous saddle coil layer; and connecting inner and outer leads of the saddle coil layers such that the saddle coil layers are in series with current flowing in the same direction in each saddle coil layer, thereby forming a multilayer saddle coil.

13. The saddle coil winding method of claim 1, further comprising applying a coating to the saddle coil layer.

* * * * *